United States Patent
Kamijo et al.

(10) Patent No.: US 9,720,343 B2
(45) Date of Patent: Aug. 1, 2017

(54) CONDUCTIVE MEMBER, CHARGING DEVICE, PROCESS CARTRIDGE, AND IMAGE FORMING APPARATUS

(71) Applicant: FUJI XEROX CO., LTD., Tokyo (JP)

(72) Inventors: Yukiko Kamijo, Kanagawa (JP); Taketoshi Hoshizaki, Kanagawa (JP); Hidemi Nukada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/060,668

(22) Filed: Mar. 4, 2016

(65) Prior Publication Data
US 2017/0003616 A1     Jan. 5, 2017

(30) Foreign Application Priority Data
Jul. 1, 2015   (JP) ................. 2015-133058

(51) Int. Cl.
  *G03G 15/02*   (2006.01)
  *H02J 7/00*    (2006.01)

(52) U.S. Cl.
  CPC ........ *G03G 15/0233* (2013.01); *H02J 7/0042* (2013.01)

(58) Field of Classification Search
  None
  See application file for complete search history.

(56) References Cited

U.S. PATENT DOCUMENTS

| | | | |
|---|---|---|---|
| 8,275,293 B2 | 9/2012 | Ono | |
| 2010/0247149 A1* | 9/2010 | Hoshio | G03G 15/0233 399/176 |
| 2011/0013939 A1* | 1/2011 | Ono | G03G 15/0233 399/176 |

FOREIGN PATENT DOCUMENTS

JP    5493529 B2   5/2014

* cited by examiner

*Primary Examiner* — Clayton E LaBalle
*Assistant Examiner* — Victor Verbitsky
(74) *Attorney, Agent, or Firm* — Sughrue Mion, PLLC (57) ABSTRACT

A conductive member includes a substrate, an elastic layer formed on the substrate, and a surface layer formed on the elastic layer, wherein the surface layer has a sea-island structure that includes a sea portion at least containing a first resin and a conductive agent and island portions at least containing a second resin, the island portions have an average diameter of approximately at least 100 nm and not greater than 1/10 of the thickness of the surface layer, and the conductive agent contained in the sea portion is unevenly distributed in the vicinity of the interface of the sea portion with the island portions.

11 Claims, 6 Drawing Sheets

CONDUCTIVE MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2015-133058 filed Jul. 1, 2015.

BACKGROUND (i) Technical Field

The present invention relates to a conductive member, a charging device, a process cartridge, and an image forming apparatus.

(ii) Related Art

In formation of images through an electrophotographic process, the surface of a photoconductor is charged and exposed to light to form electrostatic latent images thereon, the electrostatic latent images are developed with charged toner into toner images, and the toner images are transferred to recording media, such as paper, and then fixed. Inside an image forming apparatus that serves for formation of images in such a manner, a conductive member is provided as a charging unit or a transfer unit.

SUMMARY

According to an aspect of the present invention, there is provided a conductive member including a substrate, an elastic layer formed on the substrate, and a surface layer formed on the elastic layer, wherein the surface layer has a sea-island structure that includes a sea portion at least containing a first resin and a conductive agent and island portions at least containing a second resin, the island portions have an average diameter of approximately at least 100 nm and not greater than $1/10$ of the thickness of the surface layer, and the conductive agent contained in the sea portion is unevenly distributed in the vicinity of the interface of the sea portion with the island portions.

BRIEF DESCRIPTION OF THE DRAWINGS

Exemplary embodiments of the present invention will be described in detail based on the following figures, wherein.

DETAILED DESCRIPTION

Exemplary embodiments that are examples of the invention will now be described with reference to the drawings.

Conductive Member

Figure 1:
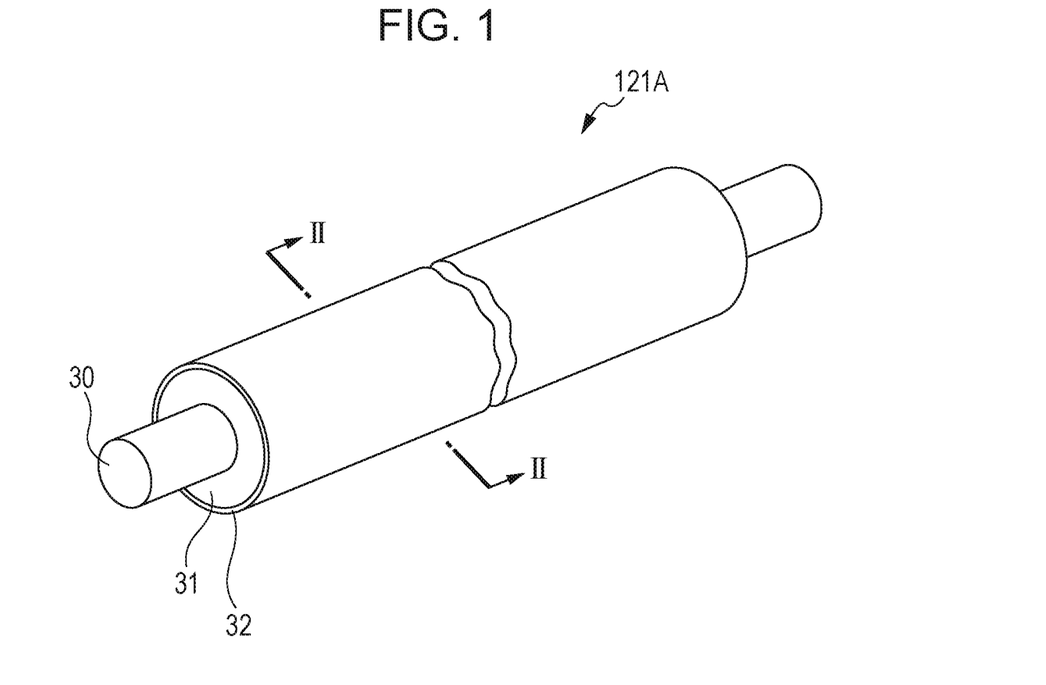
FIG. 1 is a schematic perspective view illustrating an example of a conductive member according to a first exemplary embodiment.
Figure 2:
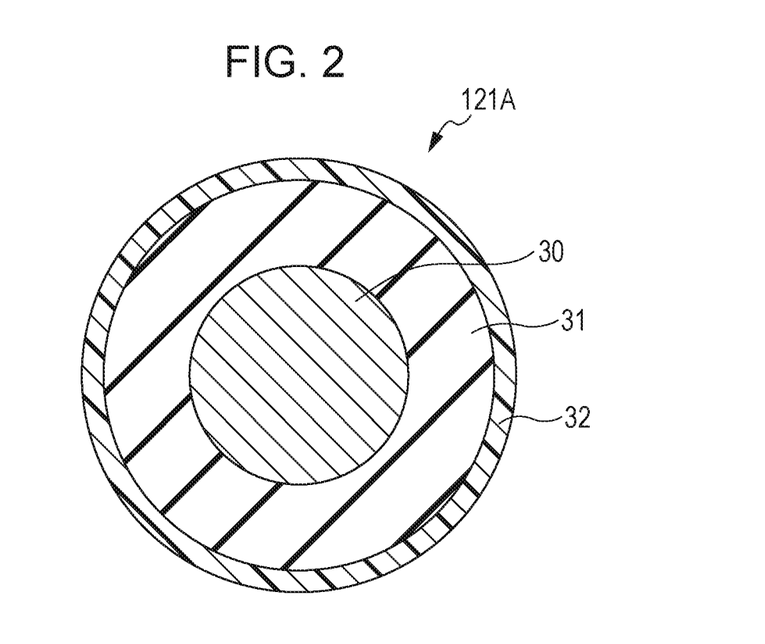
FIG. 2 is a schematic cross-sectional view illustrating the example of the conductive member according to the first exemplary embodiment.
Figure 3:
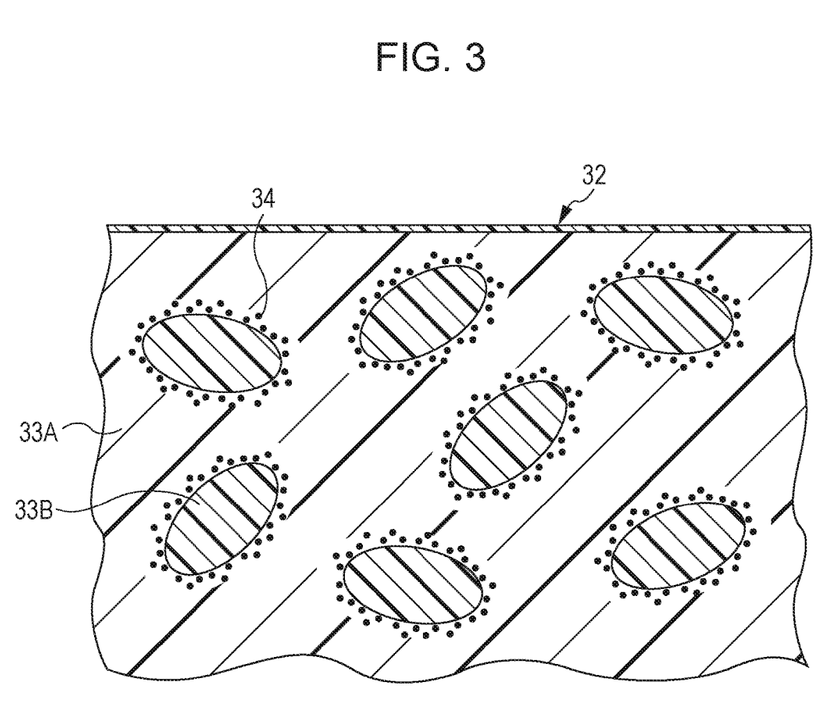
FIG. 3 is an enlarged cross-sectional view illustrating a surface layer in the example of the conductive member according to the first exemplary embodiment.

FIG. 1 is a schematic perspective view illustrating an example of a conductive member according to a first exemplary embodiment. FIG. 2 is a schematic cross-sectional view illustrating the example of the conductive member according to the first exemplary embodiment. FIG. 3 is an enlarged cross-sectional view illustrating a surface layer in the example of the conductive member according to the first exemplary embodiment. FIG. 2 is a cross-sectional view taken along the line II-II in FIG. 1.

A conductive member 121A according to the first exemplary embodiment is, for instance, in the form of a roll and includes a shaft 30 (example of a substrate), an elastic layer 31 formed on the outer surface of the shaft 30, and a surface layer 32 formed on the outer surface of the elastic layer 31 as illustrated in FIGS. 1 and 2.

The surface layer 32 has a sea-island structure including a sea portion 33A and island portions 33b as illustrated in FIG. 3. The term "sea-island structure" herein refers to a state in which at least two mixed resins are incompatible with each other and in which the island portions 33B as the dispersed phase are within the sea portion 33A as the continuous phase. The resin contained in the sea portion 33A is herein referred to as "first resin", and the resin contained in the island portions 33B is herein referred to as "second resin".

In the surface layer 32, the island portions 33B have an average diameter of about at least 100 nm and less than or equal to $1/10$ of the thickness of the surface layer 32. The thickness of the surface layer 32 is preferably in the range of 3 μm to 25 μm, more preferably 5 μm to 20 μm, and further preferably 6 μm to 15 μm.

The average diameter of the island portions 33B are determined as follows.

A slice of a sample is prepared by cutting the surface layer 32 in the thickness direction with a cryomicrotome, and the sample is observed with a scanning electron microscope to select 10 arbitrary island portions 33B. In each of the selected 10 island portions 33B, the maximum length between any two points on the outline (namely, longer diameter) is determined. The average of the longer diameters of the 10 island portions 33B is defined as the average diameter (nm) thereof.

The thickness of the surface layer 32 is determined through observation of the cross-sectional surface thereof in the thickness direction with a scanning electron microscope.

The surface layer 32 has the sea-island structure including the sea portion 33A and the island portions 33B and also contains a conductive agent 34 as illustrated in FIG. 3.

The conductive agent 34 contained in the surface layer 32 is present at least in the sea portion 33A and may be preset in the island portions 33B; however, the conductive agent 34 is suitably present more in the sea portion 33A than in the island portions 33B. The content percentage of the conductive agent 34 in the sea portion 33A relative to the total amount thereof in the whole surface layer 32 (also referred to as "percentage of uneven distribution in the sea portion 33A") is preferably approximately not less than 80%, and more preferably approximately not less than 85%.

The conductive agent 34 that is present in the sea portion 33A is unevenly distributed near the interface of the sea portion 33A with each of the island portions 33B.

The state in which the conductive agent 34 that is preset in the sea portion 33A is unevenly distributed near the interface of the sea portion 33A with each of the island portions 33B can be shown by the content percentage of the conductive agent 34 that is present in part of the sea portion 33A within 100 nm from the interface of the sea portion 33A with each of the island portions 33B (also referred to as "percentage of uneven distribution at the interface of the sea portion 33A"). When the percentage of uneven distribution at the interface of the sea portion 33A is approximately not less than 80%, this shows a state in which the conductive agent 34 that is preset in the sea portion 33A is unevenly distributed near the interface of the sea portion 33A with each of the island portions 33B. The higher the percentage of the uneven distribution at the interface of the sea portion 33A is, the more suitable; in particular, the percentage of approximately not less than 85% is suitable.

The percentage of uneven distribution of the conductive agent 34 in the sea portion 33A and the percentage thereof at the interface of the sea portion 33A are determined as follows.

A slice of a sample is prepared by cutting the surface layer 32 in the thickness direction with a cryomicrotome, and the sample is observed with a scanning electron microscope to select 10 arbitrary 4 μm square regions including the sea portion 33A and the island portions 33B. In each of the regions, the whole area of the conductive agent 34, the area of the conductive agent 34 in the sea portion 33A, and the area of the conductive agent 34 in part of the sea portion 33A within 100 nm from the interface of the sea portion 33A with each of the island portions 33B are measured. In the case where the thickness of the surface layer 32 is less than 4 μm, the number of the regions to be analyzed is increased so that the total area can be the same as the above-mentioned area subjected to such an analysis.

The percentage of the uneven distribution in the sea portion 33A is given as follows: the calculation of "the area of the conductive agent 34 in the sea portion 33A÷the whole area of the conductive agent 34×100" is made, and the average of the results of the calculation in the 10 regions is determined and defined as the percentage of the uneven distribution in the sea portion 33A (%).

The percentage of the uneven distribution at the interface of the sea portion 33A is given as follows: the calculation of "the area of the conductive agent 34 in part of the sea portion 33A within 100 nm from the interface÷the area of the conductive agent 34 in the sea portion 33A×100" is made, and the average of the results of the calculation in the 10 regions is determined and defined as the percentage of the uneven distribution at the interface of the sea portion 33A (%).

In the conductive member 121A according to the first exemplary embodiment, the average diameter of the island portions 33B is approximately at least 100 nm and less than or equal to 1/10 of the thickness of the surface layer 32, and the conductive agent 34 that is present in the sea portion 33A is unevenly distributed in the vicinity of the interface of the sea portion 33A with the island portions 33B, so that the occurrence of uneven image density is reduced. It is believed that this reduction in the occurrence of uneven image density is given by the following mechanism.

The conductive member is used as, for example, a charging member that serves to charge an image carrier in an electrophotographic image forming apparatus. When the conductive member, as a charging member, charges the surface of the image carrier, it needs to be subjected to application and discharging of electricity at a speed proper for the rotational speed of the image carrier to highly evenly charge the surface of the image carrier, which enables formation of an image with uneven image density being reduced. If the conduction rate in the conductive member is small relative to the rotational speed of the image carrier, it is hard to highly evenly charge the surface of the image carrier.

An enhancement in the amount of the conductive agent contained in the surface layer may be one of techniques for increasing the conduction rate in the conductive member. The enhancement in the amount of the conductive agent, however, results in uneven electric discharge due to uneven distribution of the conductive agent in the surface layer or due to formation of relatively large agglomerate in some cases.

In the conductive member 121A according to the first exemplary embodiment, the average diameter of the island portions 33B is approximately at least 100 nm and less than or equal to 1/10 of the thickness of the surface layer 32, and the conductive agent 34 that is present in the sea portion 33A is unevenly distributed in the vicinity of the interface of the sea portion 33A with each of the island portions 33B. This means that the conductive agent 34 is present in high density along the outside of each of the island portions 33B having an appropriate size.

In the conductive member 121A, since the conductive agent 34 that is present in the sea portion 33A is unevenly distributed in the vicinity of the interface of the sea portion 33A with each of the island portions 33B, the regions in which the concentration of the conductive agent 34 is high exist on the outer side of the island portions 33B as compared with the case where the conductive agent is dispersed in the whole of the sea portion. In the conductive member 121A, such high-concentration regions of the conductive agent 34 serve as conductive paths that exist at some intervals; hence, it is believed that the conductive efficiency of the surface layer 32 in the thickness direction is higher as compared with the case where the conductive agent is dispersed in the whole of the sea portion.

Comparing the case where the uneven distribution of the conductive agent near the interface between the sea portion and each of the island portions is outside the island portions with the case where it is inside the island portions, the distance between the high-concentration regions of the conductive agent is smaller in the former case, and the distance between the surface of the surface layer and the high-concentration regions of the conductive agent is smaller also in the former case; hence, it is considered that the conductive efficiency of the whole surface layer in the thickness direction becomes high.

In the conductive member 121A, the average diameter of the island portions 33B is approximately at least 100 nm and less than or equal to 1/10 of the thickness of the surface layer 32, and it is speculated that the conductive efficiency of the surface layer 32 in the thickness direction is therefore high.

In the case where the average diameter of the island portions is less than 100 nm, the number of the island portions in the thickness direction of the surface layer is excessive; in this case, it is speculated that the conductive efficiency of the whole surface layer is not enhanced. For this reason, the average diameter of the island portions 33B is approximately not less than 100 nm, preferably approximately not less than 150 nm, and more preferably approximately not less than 200 nm.

In the case where the average diameter of the island portions is greater than 1/10 of the thickness of the surface layer, it is believed that the volume of a single island portion is large and that the conductive path along the outer side of each of the island portions 33B therefore becomes long. In addition, the electric discharge from the surface of the roll becomes irregular, which results in the easy occurrence of uneven electric discharge. Thus, the average diameter of the island portions 33B is about less than or equal to 1/10 of the thickness of the surface layer 32, preferably about less than or equal to 1/15, and more preferably about less than or equal to 1/20. In particular, the average diameter of the island portions 33B is approximately preferably not less than 1000 nm, more preferably not less than 800 nm, and further preferably not less than 600 nm.

Furthermore, in the conductive member 121A according to the first exemplary embodiment, the amount of the conductive agent in the whole surface layer does not need to be large; hence, uneven electrical discharge due to uneven dispersion of the conductive agent or formation of relatively large agglomeration is less likely to be caused.

In the conductive member 121A according to the first exemplary embodiment, the surface layer 32 has a conductive path for efficient electric conduction from one part to another part owing to the mechanism described above; hence, it is speculated that the conduction rate in the thickness direction of the surface layer 32 is high and that the conductive member 121A enables a reduction in uneven charging on the surface of the image carrier, the uneven charging being likely to occur in proportion to an increase in the rotational speed of the image carrier. The conductive member 121A according to the first exemplary embodiment enables a reduction in the occurrence of uneven image density in the initial stage of use thereof and even after repeated formation of images.

It is believed that the conductive efficiency in the thickness direction of the surface layer 32 is further enhanced in the case where the percentage of uneven distribution of the conductive agent 34 in the sea portion 33A in the conductive member 121A according to the first exemplary embodiment is approximately not less than 80% (preferably approximately not less than 85%) and that the occurrence of uneven image density is therefore further reduced.

The average diameter of the island portions 33B and the uneven distribution of the conductive agent 34 can be controlled, for instance, as follows.

The average diameter of the island portions 33B can be controlled, for example, by adjustment of the first resin content and the second resin content in a dispersion liquid in which the first resin, the second resin, and the conductive agent have been dissolved and dispersed in a solvent and which is to be applied onto the outer surface of the elastic layer 31 to form the surface layer 32.

In addition, when the dispersion liquid is applied to the outer surface of the elastic layer 31 to form the surface layer 32, time for dying the applied dispersion liquid (also referred to as "coating film") can be adjusted (time for which the coating film has been wet is adjusted) to control the average diameter of the island portions 33B. The longer the time for which the coating film has been wet is, the more the island portions are likely to become large; the shorter the time for which the coating film has been wet is, the more the island portions are likely to become small. The time for drying the coating film can be adjusted by changes in types of a solvent used for preparing the dispersion liquid, a mixing ratio, the temperature of the dispersion liquid, and conditions for drying the coating film (e.g., temperature, humidity, and blow of air).

In order to produce the uneven distribution of the conductive agent 34 in the sea portion 33A, for example, a resin having a smaller affinity for the conductive agent than the first resin can be selected as the second resin; the percentage of uneven distribution of the conductive agent 34 in the sea portion 33A and the percentage of the uneven distribution of the conductive agent 34 at the interface of the sea portion 33A can be adjusted on the basis of the degree of the affinity of each type of the resins for the conductive agent. These percentages of the uneven distribution can be also controlled by the following: surface treatment and modification of the conductive agent, adjustment of the dispersibility of the dispersion liquid in which the first resin, the second resin, and the conductive agent have been dissolved and dispersed in a solvent, a change in the amount of the conductive agent contained in the dispersion liquid (the larger the amount of the conductive agent is, the more the degree of uneven distribution near the interface is likely to become small), and a combination thereof.

The detail of each of the layers of the conductive member 121A according to the first exemplary embodiment and a method for producing the layers will now be described.

Surface Layer 32

The surface layer 32 has a sea-island structure. The sea-island structure is formed by adjusting a difference in a solubility parameter (SP value) between the first resin and the second resin and adjusting the content percentages of the first resin and second resin. The difference in an SP value between the first resin and the second resin is suitably from 2 to 10 in terms of easy formation of the sea-island structure. The second resin content is preferably from 2 to 20 parts by weight, and more preferably 5 to 15 parts by weight relative to 100 parts by weight of the first resin in view of easy formation of the island portions each having an appropriate size.

The solubility parameter (SP value) is calculated in accordance with *Polymer Handbook, 4th Edition*; John Wiley & Sons, Inc.; VII 680 to 683 in the first exemplary embodiment. The solubility parameters of the major types of resins are written in VII 702 to 711 in this literature.

Examples of the first resin used for forming the sea portion 33A include acrylic resin, cellulose resins, polyamide resins, copolymer nylon, polyurethane resins, polycarbonate resins, polyester resins, polyethylene resins, polyvinyl resins, polyarylate resins, styrene-butadiene resins, melamine resins, epoxy resins, urethane resins, silicone resins, fluoro-resins (e.g., a tetrafluoroethylene-perfluoroalkyl vinyl ether copolymer, a tetrafluoroethylene-hexafluoropropylene copolymer, and polyvinylidene fluoride), and urea resins. Copolymer nylon is a copolymer which contains one of or multiple kinds of nylon 610, nylon 11, and nylon 12 as a polymerized unit and which may contain nylon 6 or nylon 66 as another polymerized unit. An elastic material used for forming the elastic layer 31 may be used as the first resin. The first resin may be a single resin or a combination of two or more resins.

The first resin used for forming the sea portion 33A is preferably a polyamide resin (nylon), and more preferably a methoxymethylated polyamide resin (methoxymethylated nylon) in terms of the following: the electric properties of the surface layer 32 and the resistance thereof to contamination, the proper hardness and maintainability of the surface layer 32 with consideration for the surface layer 32 being disposed on the elastic layer 31, and the dispersibility and film formability of the conductive agent in the case of using a dispersion liquid for forming the surface layer 32.

Examples of the second resin used for forming the island portions 33B include polyvinyl butyral resins, polystyrene resins, and polyvinyl alcohols. The second resin may be a single resin or a combination of two or more resins.

Examples of the conductive agent 34 include electronic conductive agents and ionic conductive agents. Examples of the electronic conductive agents include powders of carbon blacks such as Ketjenblack and acetylene black; pyrolytic carbon and graphite; conductive metals and alloys such as aluminum, copper, nickel, and stainless steel; conductive metal oxides such as tin oxide, indium oxide, titanium oxide, tin oxide-antimony oxide solid solution, and tin oxide-indium oxide solid solution; and insulators subjected to a surface treatment to be conductive. Examples of the ionic conductive agents include perchlorates and chlorates of oniums, such as tetraethylammonium and lauryltrimethylammonium, and perchlorates and chlorates of alkali metals or alkaline earth metals such as lithium or magnesium. These conductive agents may be used alone or in combination.

The conductive agent 34 is suitably carbon black. Examples of the carbon black include Ketjenblack, acetylene black, and oxidized carbon black having a pH of about 5 or lower. Specific examples thereof include SPECIAL BLACK 350, SPECIAL BLACK 100, SPECIAL BLACK 250, SPECIAL BLACK 5, SPECIAL BLACK 4, SPECIAL BLACK 4A, SPECIAL BLACK 550, SPECIAL BLACK 6, COLOR BLACK FW200, COLOR BLACK FW2, and COLOR BLACK FW2V each manufactured by Orion Engineered Carbons S.A. and MONARCH 880, MONARCH 1000, MONARCH 1300, MONARCH 1400, and MOGUL-L, and REGAL 400R each manufactured by Cabot Corporation.

The amount of the conductive agent 34 in the surface layer 32 is preferably from 3 weight % to 30 weight %, and more preferably 5 weight % to 20 weight % relative to the weight of the surface layer 32.

The volume resistivity of the surface layer 32 is suitably at least $10^3$ Ωcm and not greater than $10^{14}$ Ωcm.

Elastic Layer 31

The elastic layer 31, for instance, contains an elastic material, a conductive agent, and another additive.

Examples of the elastic material include isoprene rubber, chloroprene rubber, epichlorohydrin rubber, butyl rubber, polyurethane, silicone rubber, fluoro-rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer (EPDM), acrylonitrile-butadiene copolymer rubber (NBR), natural rubber, and blended rubber thereof. In particular, polyurethane, silicone rubber, EPDM, epichlorohydrin-ethylene oxide copolymer rubber, epichlorohydrin-ethylene oxide-allyl glycidyl ether copolymer rubber, NBR, and blended rubber thereof are suitable. These elastic materials may be foamed or non-foamed.

Examples of the conductive agent include electronic conductive agents and ionic conductive agents. Examples of the electronic conductive agents include powders of carbon blacks such as Ketjenblack and acetylene black; pyrolytic carbon and graphite; conductive metals and alloys such as aluminum, copper, nickel, and stainless steel; conductive metal oxides such as tin oxide, indium oxide, titanium oxide, tin oxide-antimony oxide solid solution, and tin oxide-indium oxide solid solution; and insulators subjected to a surface treatment to be conductive. Examples of the ionic conductive agents include perchlorates and chlorates of oniums, such as tetraethylammonium and lauryltrimethylammonium, and perchlorates and chlorates of alkali metals or alkaline earth metals such as lithium or magnesium. These conductive agents may be used alone or in combination.

Specific examples of carbon black include SPECIAL BLACK 350, SPECIAL BLACK 100, SPECIAL BLACK 250, SPECIAL BLACK 5, SPECIAL BLACK 4, SPECIAL BLACK 4A, SPECIAL BLACK 550, SPECIAL BLACK 6, COLOR BLACK FW200, COLOR BLACK FW2, and COLOR BLACK FW2V each manufactured by Orion Engineered Carbons S.A. and MONARCH 880, MONARCH 1000, MONARCH 1300, MONARCH 1400, and MOGUL-L, and REGAL 400R each manufactured by Cabot Corporation.

The amount of the conductive agent is not specifically limited; the amount of the electronic conductive agent is desirably in the range of 1 part by weight to 30 parts by weight, and more desirably 15 parts by weight to 25 parts by weight relative to 100 parts by weight of the elastic material. In the case where the ionic conductive agent is employed, the amount thereof is desirably in the range of 0.1 part by weight to 5.0 parts by weight, and more desirably 0.5 parts by weight to 3.0 parts by weight relative to 100 parts by weight of the elastic material.

Examples of another additive to be used in the elastic layer 31 include materials which may be typically used for forming an elastic layer, such as a softener, a plasticizer, a curing agent, a vulcanizing agent, a vulcanizing accelerator, an antioxidant, a surfactant, a coupling agent, and a filler (such as silica and calcium carbonate).

The thickness of the elastic layer 31 is desirably approximately from 1 mm to 15 mm, and more desirably approximately from 2 mm to 10 mm on average.

The volume resistivity of the elastic layer 31 is desirably at least $10^3$ Ωcm and not greater than $10^{14}$ Ωcm.

Shaft 30

The shaft 30 is a conductive member that is in the cylindrical or columnar form. In this case, the term "conductive" refers to a volume resistivity of less than $10^{13}$ Ωcm.

Examples of the material used for forming the shaft 30 include metallic materials such as iron (e.g., free-cutting steel), copper, brass, stainless steel, aluminum, and nickel. The shaft 30 may be, for example, a member (such as a resin or ceramic member) of which the outer surface has been plated or a member (such as a resin or ceramic member) in which a conductive agent has been dispersed.

Method for Producing Conductive Member 121A

A roll member in which the elastic layer 31 is disposed on the outer surface of the shaft 30 having a cylindrical or columnar shape is prepared. The roll member can be prepared by any technique. An example of a technique for producing the roll member is as follows: winding a rubber material or a mixture of a rubber material and optionally a conductive agent and another additive around the shat 30 and heating the wound material for vulcanization to form the elastic layer 31.

The surface layer 32 can be formed on the outer surface of the elastic layer 31 by any technique. A desired technique for forming the elastic layer 31 involves applying a dispersion liquid in which the first resin, the second resin, and the conductive agent have been dissolved and dispersed in a solvent to the outer surface of the elastic layer 31 and drying the applied dispersion liquid. Examples of a technique for applying the dispersion liquid include blade coating, wirebar coating, spray coating, dip coating, bead coating, air knife coating, and curtain coating.

The conductive member 121A that is a roll member has been described as the conductive member according to the first exemplary embodiment; however, the conductive member according to the first exemplary embodiment is not limited thereto and may be in the form of an endless belt or a sheet.

The conductive member according to the first exemplary embodiment may have a structure including, for example, an adhesive layer (primer layer) disposed between the substrate and the elastic layer, a resistance-adjusting layer or transfer-preventing layer disposed between the elastic layer and the surface layer, and a coating layer (protection layer) disposed on the outer side (outermost surface) of the surface layer.

Charging Device

Figure 4:
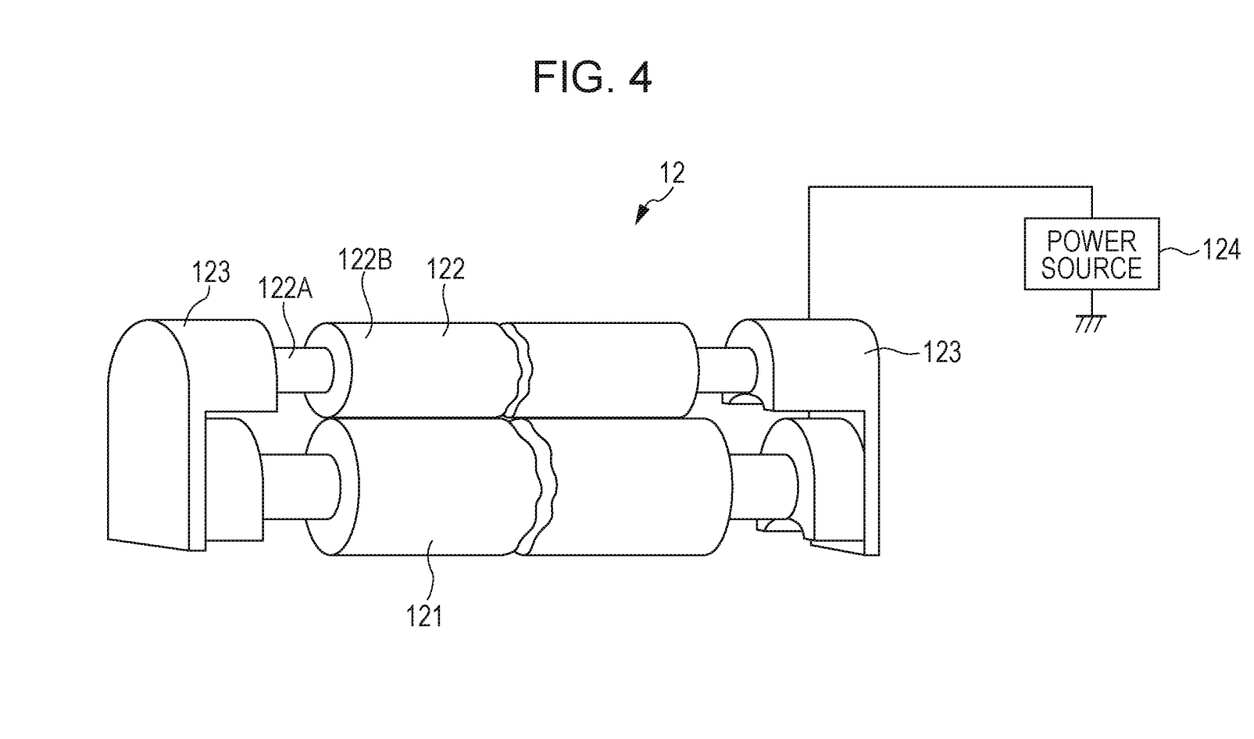
FIG. 4 is a schematic perspective view illustrating an example of a charging device according to a second exemplary embodiment.

A charging device according to a second exemplary embodiment will now be described. FIG. 4 is a schematic perspective view illustrating an example of the charging device according to the second exemplary embodiment. The charging device according to the second exemplary embodiment includes a charging member that is the conductive member according to the first exemplary embodiment.

A charging device 12 according to the second exemplary embodiment includes, for example, a charging member 121 and cleaning member 122 which are in contact with each other as illustrated in FIG. 4. The two ends of the shaft of the charging member 121 and the two ends of the shaft 122A of the cleaning member 122 in the axial direction are held by conductive shaft bearings 123 (conductive bearings) such that these members can rotate. One of the conductive shaft bearings 123 is in connection with a power source 124. The charging device according to the second exemplary embodiment may have any other structure than the above structure; for instance, the cleaning member 122 may not be provided.

The cleaning member 122 serves for cleaning the surface of the charging member 121 and is in the form of, for example, a roll. The cleaning member 122 includes, for instance, the shaft 122A and an elastic layer 122B disposed on the outer surface thereof.

The shaft 122A is a conductive member that is in the cylindrical or columnar form. Examples of the material used for forming the shaft 122A include metallic materials such as iron (e.g., free-cutting steel), copper, brass, stainless steel, aluminum, and nickel. The shaft 122A may be, for example, a member (such as a resin or ceramic member) of which the outer surface has been plated or a member (such as a resin or ceramic member) in which a conductive agent has been dispersed.

The elastic layer 122B is desirably formed of a foamed material having a three-dimensional porous structure, has hollows and roughness inside it and on the surface thereof, and is elastic. Specific examples of the material used for forming the elastic layer 122B include foamed resin materials and rubber materials, such as polyurethane, polyethylene, polyamide, olefin, melamine or polypropylene, acrylonitrile-butadiene copolymer rubber (NBR), ethylene-propylene-diene copolymer rubber (EPDM), natural rubber, styrene-butadiene rubber, chloroprene, silicone, and nitrile.

Among these foamed resin materials and rubber materials, polyurethane can be particularly suitably used because foreign substances, such as toner particles or external additives, are efficiently removed by frictional slide over the charging member 121, the surface of the charging member 121 is less likely to be damaged by the friction thereof with the cleaning member 122, and the elastic layer 122B is less likely to be torn and broken for a long time.

The polyurethane is not particularly limited, and examples thereof include reactants obtained from the reaction of polyols (e.g., polyester polyol, polyether polyol, and acrylpolyol) with isocyanates (e.g., 2,4-trilene diisocyanate, 2,6-trilene diisocyanate, 4,4-diphenylmethane diisocyanate, tolidine diisocyanate, and 1,6-hexamethylene diisocyanate) and reactants obtained from a reaction that involves using chain extenders thereof (e.g., 1,4-butanediol and trimethylol propane). The polyurethane is typically foamed by using a foaming agent (e.g., water or azo compounds such as azodicarbonamide and azobisisobutyronitrile).

The conductive shaft bearings 123 serve to integrally hold the charging member 121 and the cleaning member 122 such that these two members can rotate and to maintain the inter-shaft distance therebetween. The conductive shaft bearings 123 may be formed of any material and in any shape provided that they are made of a conductive material. Examples thereof include conductive bearings and conductive sliding bearings.

The power source 124 is a device that applies a voltage to the conductive shaft bearings 123 to charge the charging member 121 and the cleaning member 122, and a known high-voltage power source is employed.

Image Forming Apparatus and Process Cartridge

An image forming apparatus according to a third exemplary embodiment includes an image carrier, a charging unit that charges the image carrier, a latent image forming unit that forms a latent image on the surface of the charged image carrier, a developing unit that develops the latent image on the surface of the image carrier with toner to form a toner image, and a transfer unit that transfers the toner image formed on the surface of the image carrier to a recording medium. The charging unit has the conductive member according to the first exemplary embodiment; in other words, the charging unit is the charging device according to the second exemplary embodiment.

A process cartridge according to a fourth exemplary embodiment is removably attached to the image forming apparatus and includes an image carrier and a charging unit that charges the image carrier. The charging unit has the conductive member according to the first exemplary embodiment; in other words, the charging unit is the charging device according to the second exemplary embodiment.

The process cartridge according to the fourth exemplary embodiment may optionally include at least one selected from a developing unit that develops a latent image on the surface of the image carrier with toner to form a toner image, a transfer unit that transfers the toner image formed on the surface of the image carrier to a recording medium, and a cleaning unit that removes the toner remaining on the surface of the image carrier after the transfer.

Figure 5:
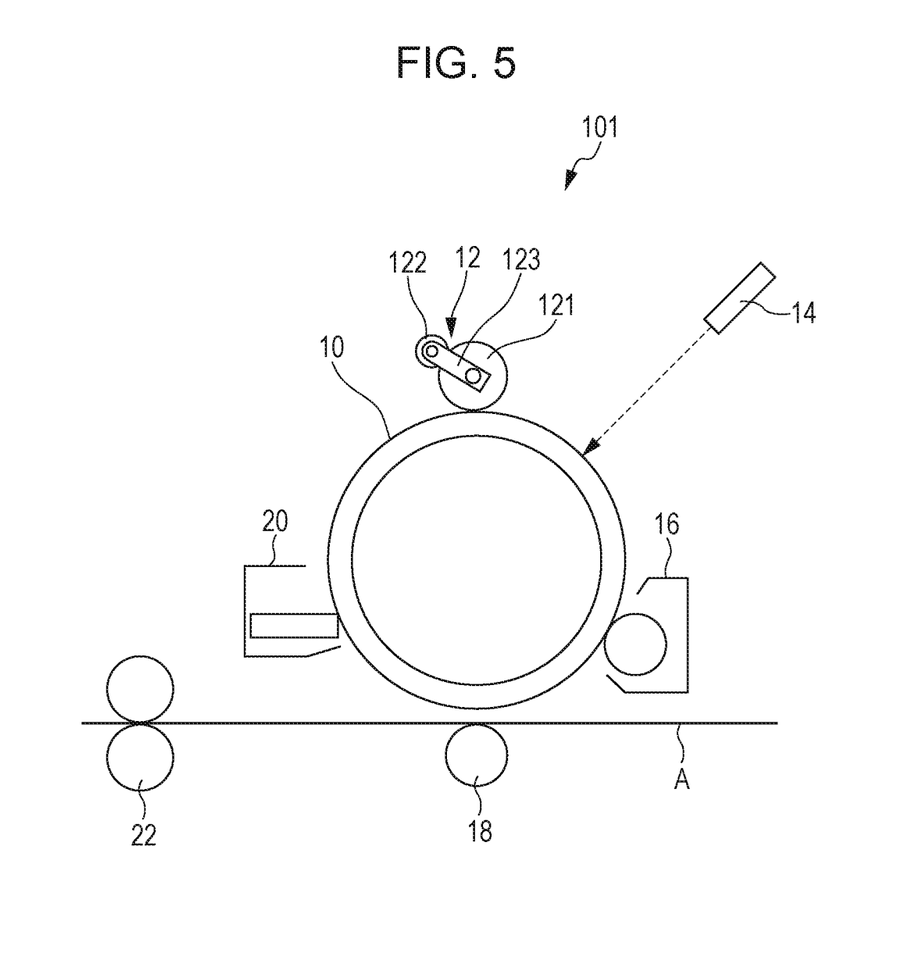
FIG. 5 is a schematic view illustrating an example of the structure of an image forming apparatus according to a third exemplary embodiment.
Figure 6:
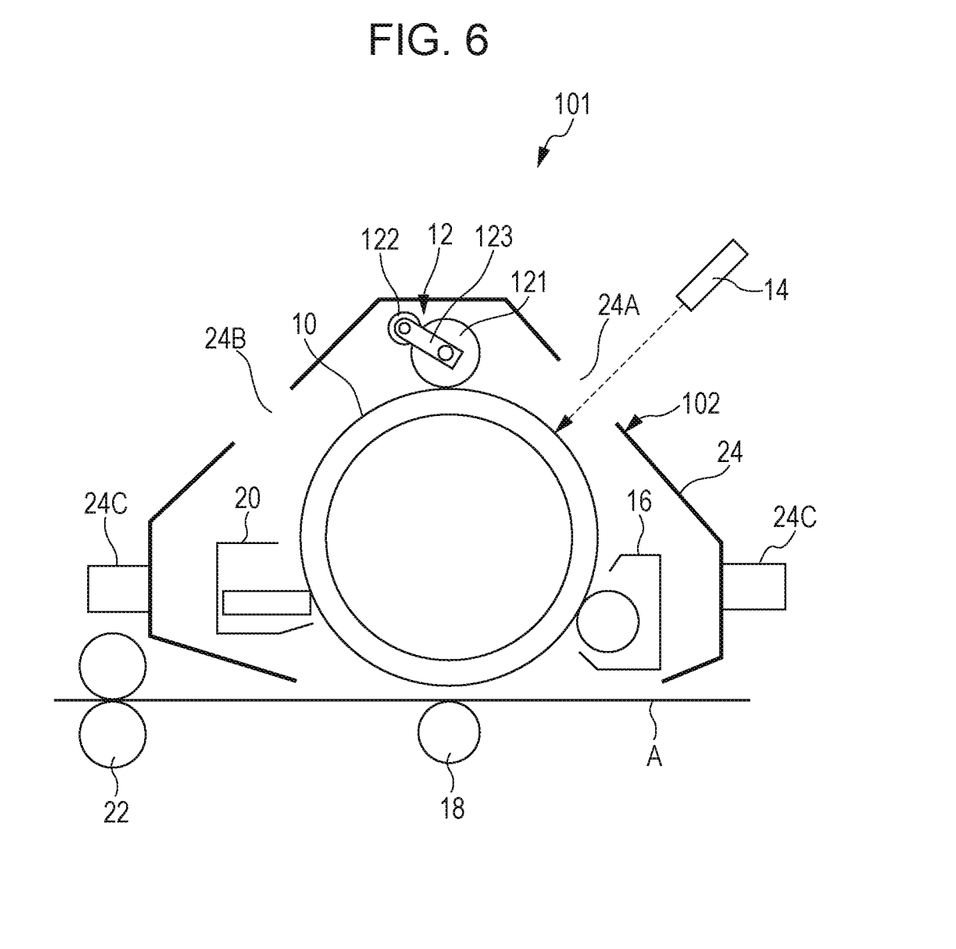
FIG. 6 is a schematic view illustrating an example of the structure of a process cartridge according to a fourth exemplary embodiment.

The image forming apparatus and the process cartridge according to the third and fourth exemplary embodiments will be described with reference to the drawings. FIG. 5 is a schematic view illustrating an example of the structure of the image forming apparatus according to the third exemplary embodiment. FIG. 6 is a schematic view illustrating an example of the structure of the process cartridge according to the fourth exemplary embodiment.

As illustrated in FIG. 5, an image forming apparatus 101 according to the third exemplary embodiment includes an image carrier 10 and other devices disposed around it, including a charging device 12 that charges the image carrier 10, an exposure device 14 that exposes the image carrier 10 charged by the charging device 12 to light to form a latent image, a developing device 16 that develops the latent image formed by the exposure device 14 with toner to form a toner image, a transfer device 18 that transfers the toner image formed by the developing device 16 to a recording medium A, a cleaner 20 that removes toner remaining on the surface of the image carrier 10 after the transfer, and a fixing device 22 that fixes the toner image transferred to the recording medium A by the transfer device 18.

The charging device 12 of the image forming apparatus 101 can be, for example, the charging device 12 illustrated in FIG. 4. The image carrier 10, the exposure device 14, the developing device 16, the transfer device 18, the cleaner 20, and the fixing device 22 in the image forming apparatus 101 can be known ones typically used in electrophotographic image forming apparatuses. Examples of these devices will now be described.

The image carrier 10 is not particularly limited, and a known photoconductor can be used. The image carrier 10 is suitably a functionally separated organic photoconductor in which a charge-generating layer and an charge-transporting layer are separated or a photoconductor having a surface formed of a siloxane resin or phenolic resin that enables transportation of charges and that has a cross-linked structure.

The exposure device 14 can be, for example, a laser optical system and an LED array.

The developing device 16, for instance, serves to bring a developer carrier, of which the layer of a developer has been formed on the surface, into contact with or close to the image carrier 10 to attach toner to the latent image formed on the surface of the image carrier 10, so that a toner image is formed. The suitable development carried out by the developing device 16 is development with a two-component developer.

The transfer device 18 performs a transfer process such as non-contact transfer (e.g., process involving use of a corotron or scorotron) or contact transfer in which a conductive transfer roll is brought into contact with the image carrier 10 with the recording medium A interposed therebetween to transfer a toner image to the recording medium A.

In the cleaner 20, for example, a cleaning blade is directly brought into contact with the surface of the image carrier 10 to remove toner, paper dust, and dirt remaining thereon. The cleaner 20 may be a member other than the cleaning blade; for instance, it may be a cleaning brush or a cleaning roll.

The fixing device 22 is suitably a thermal fixing device involving use of a heat roll. The thermal fixing device, for example, includes a fixing roller and a pressure roller or pressure belt that is disposed so as to be in contact with the fixing roller. The fixing roller, for instance, includes a cylindrical core bar, a heater lamp provided therein, and a release layer (e.g., a thermally resistant resin coating layer and a thermally resistant rubber coating layer) formed on the outer surface of the cylindrical core bar. The pressure roller, for instance, includes a cylindrical core bar and a thermally resistant elastic layer formed on the outer surface thereof. The pressure belt, for example, includes a belt-shaped substrate and a thermally resistant elastic layer formed on the surface thereof.

The process for fixing an unfixed toner image is, for instance, as follows: the recording medium A to which an unfixed toner image has been transferred is allowed to travel between the fixing roller and the pressure roller or pressure belt to melt a binder resin, an additive, or another material contained in the toner for fixing the toner image.

The structure of the image forming apparatus 101 according to the third exemplary embodiment is not limited to the structure mentioned above; for example, the image forming apparatus 10 may be an image forming apparatus which involves use of an intermediate transfer body or a tandem-type image forming apparatus in which image forming units for forming toner images of different colors are disposed in parallel.

In a process cartridge 102 according to the fourth exemplary embodiment, as illustrated in FIG. 6, a case 24 integrally accommodates the image carrier 10, charging device 12, developing device 16, and cleaner 20 each used in the image forming apparatus illustrated in FIG. 5. The case 24 has an opening 24A that serves for the exposure process, an opening 24B that serves for exposure to remove electricity, and an attachment rail 24C. The process cartridge 102 can be removably attached to the image forming apparatus 101 illustrated in FIG. 5.

The image forming apparatus that includes the charging device of which the conductive member is the conductive member according to the first exemplary embodiment has been described in the third exemplary embodiment; however, the image forming apparatus according to the third exemplary embodiment may have a structure in which the transfer device of which the transfer member is the conductive member according to the first exemplary embodiment.

EXAMPLES

Exemplary embodiments of the invention will now be described in detail with reference to Examples but are not limited thereto.

Example 1: Production of Charging Roll 1

Formation of Elastic Layer

To 100 parts by weight of an elastic material (epichlorohydrin-ethylene oxide-allyl glycidyl ether copolymer rubber), 15 parts by weight of a conductive agent (carbon black, Asahi Thermal manufactured by Asahi Carbon Co., Ltd.), 1 part by weight of a vulcanizing agent (sulfur, 200 mesh, manufactured by Tsurumi Chemical Corporation), and 2.0 parts by weight of a vulcanizing accelerator (NOCCELER DM manufactured by OUCHI SHINKO CHEMICAL INDUSTRIAL CO., LTD.) are added, and this mixture is kneaded with an open roll to obtain a composition for forming an elastic layer. The composition for forming an elastic layer is wound around the outer surface of a shaft formed of SUS 303 and having a diameter of 8 mm (conductive support) with a pressing machine such that an adhesive layer is disposed therebetween. The resulting product is heated in a furnace at 180° C. for 30 minutes to form an elastic layer having a thickness of 3.5 mm on the shaft. The outer surface of the elastic layer is polished to produce a conductive elastic roll having a diameter of 14 mm and an elastic layer with a thickness of 3.0 mm.

Formation of Surface Layer

A nylon resin (N-methoxymethylated nylon, FR-101 manufactured by Namariichi Co., Ltd.) as a first resin is dissolved in a mixture solvent of methanol and 1-butanol (weight ratio of methanol to 1-butanol is 3:1) to prepare 100 parts by weight of a first resin solution (solid content concentration: 8 weight %). Then, 10 parts by weight of a polyvinyl butyral resin (Denka Butyral manufactured by Denka Company Limited.) as a second resin is dissolved in a mixture solvent of methanol and 1-butanol (weight ratio of methanol to 1-butanol is 3:1), 8 parts by weight of carbon black (MONARCH 880 manufactured by Cabot Corporation) is added thereto, and then the mixture is stirred for 30 minutes to prepare a second resin solution. These solutions are mixed with 2 parts by weight of a curing agent (citric acid), and this mixture is dispersed with a bead mill to produce a dispersion liquid.

The temperature of the dispersion liquid is adjusted to be 18.5° C., and the conductive elastic roll is immersed in the dispersion liquid at an environmental temperature of 21° C. to apply the dispersion liquid onto the outer surface of the conductive elastic roll. The resulting roll is held at the same temperature to be dried.

Then, a charging roll 1 in which the product is heated at 160° C. for 20 minutes to form a surface layer having a thickness of 8 μm is obtained.

Examples 2 to 8 and Comparative Examples 1 to 5: Production of Charging Rolls 2 to 8, and Comparative Charging Rolls 1 to 5

Charging rolls and Comparative Charging Rolls are produced as in Example 1 except that the types of the solvents in which the resins are to be dissolved, the mixture ratio thereof, the conductive agent content, the temperature of the dispersion liquid, and the environmental temperature in the application and drying processes in Formation of Surface Layer in Example 1 are changed as shown in Table 1.

Example 9: Production of Charging Roll 9

A charging roll 9 is produced as in Example 1 except that 10 parts by weight of Ketjenblack EC (manufactured by Lion Specialty Chemicals Co., Ltd.) is used in place of the 8 parts by weight of carbon black and that types of the solvents in which the resins are to be dissolved, the mixture ratio thereof, the temperature of the dispersion liquid, and the environmental temperature in the application and drying processes in Formation of Surface Layer in Example 1 are changed as shown in Table 1.

Example 10: Production of Charging Roll 10

A charging roll 10 is produced as in Example 1 except that 100 parts by weight of AMILAN CM8000 (manufactured by Toray Industries, Inc.) is used in place of the first resin, that 10 parts by weight of S-LEC B (manufactured by SEKISUI CHEMICAL CO., LTD.) is used instead of the second resin, and that types of the solvents in which the resins are to be dissolved, the mixture ratio thereof, the conductive agent content, the temperature of the dispersion liquid, and the environmental temperature in the application and drying processes in Formation of Surface Layer in Example 1 are changed as shown in Table 1.

Evaluation of Charging Rolls
Properties of Surface Layer

The average diameter of island portions, the percentage of uneven distribution in a sea portion, and the percentage of uneven distribution at the interface of the sea portion are measured with a scanning electron microscope (SEM) in the above-mentioned manners. Table 1 shows results of the measurement.

Figure 7:
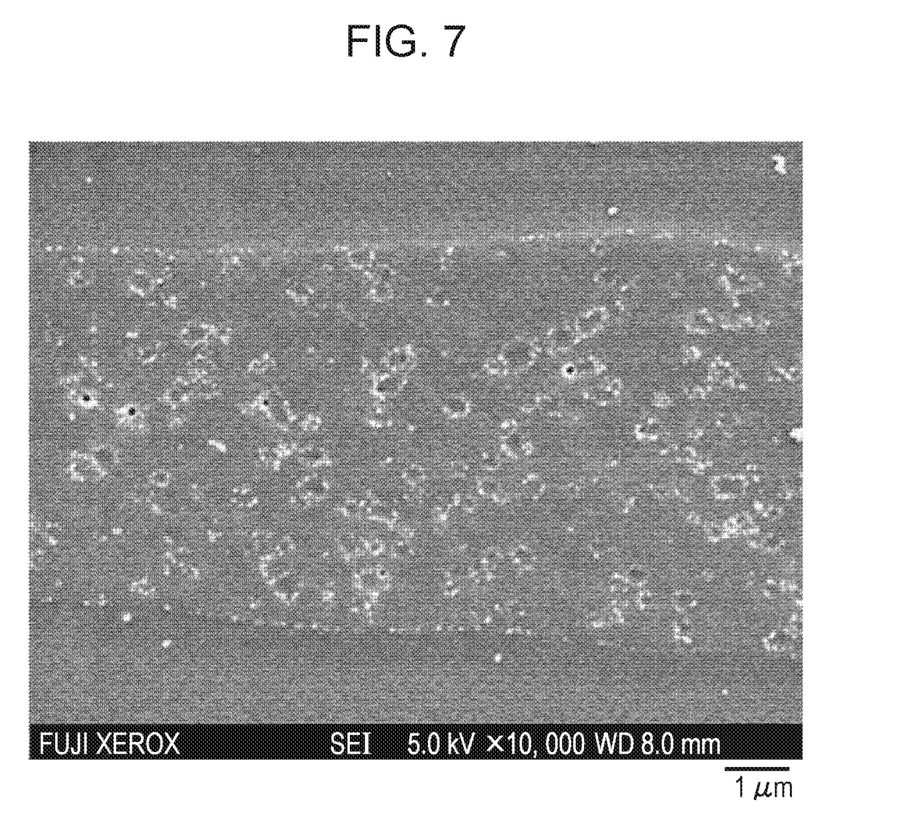
FIG. 7 illustrates a picture obtained by observation of a sample of the surface layer of a charging roll in Example 1 with a scanning electron microscope.

FIG. 7 illustrates a picture obtained by observation of the surface layer of the charging roll 1 in Example 1 with an SEM. In the picture illustrated in FIG. 7, the regions of white dots are carbon black. As is obvious from FIG. 7, carbon black that is present in the sea portion is unevenly distributed in the vicinity of the island portions in the surface layer of the charging roll.

Evaluation of Uneven Image Density

Each of the produced charging rolls is attached to the process cartridge of a color copying machine DocuCentre Color 450 manufactured by Fuji Xerox Co., Ltd., and half-tone images (image density: 50%) are output at a temperature of 10° C. and a relative humidity of 15%. Uneven image density is visually observed at 10 times and 10,000 times of the output, and the result of the observation is classified as follows.

G1 (Good): No uneven image density is observed

G2 (Acceptable): Uneven image density is observed through very careful observation, but acceptable NG (Bad): Uneven image density is clearly observed, unacceptable

TABLE 1

| | Resin | | Conductive agent, amount (parts by weight) | Solvent | | Temperature of dispersion liquid [° C.] | Environmental Temperature in application and drying processes [° C.] | Hood of application bath | Thickness of surface layer [μm] | Average diameter of island portion [nm] | Uneven distribution of conductive agent | | Uneven image density | |
| --- | --- | --- | --- | --- | --- | --- | --- | --- | --- | --- | --- | --- | --- | --- |
| | Sea portion (first resin) | Island portions (second resin) | | Type | Mixture ratio [weight ratio] | | | | | | Percentage of uneven distribution in sea portion | Percentage of uneven distribution at interface of sea portion | 10 times | 10,000 times |
| Example 1 | Nylon | PVB | CB, 8 | Methanol:1-butanol | 3:1 | 18.5 | 21 | None | 8 | 400 | 95% | 85% | G1 (Good) | G1 (Good) |
| Example 2 | Nylon | PVB | CB, 12 | Methanol:1-butanol | 70:25:5 | 18.5 | 21 | None | 10 | 600 | 90% | 90% | G1 (Good) | G1 (Good) |
| Example 3 | Nylon | PVB | CB, 12 | Methanol:1-butanol Cyclopentanol | 70:25:5 | 18.5 | 21 | None | 10 | 500 | 85% | 88% | G1 (Good) | G1 (Good) |
| Example 4 | Nylon | PVB | CB, 12 | Methanol:1-butanol 2-butanol | 70:25:5 | 18.5 | 21 | None | 10 | 500 | 83% | 89% | G1 (Good) | G1 (Good) |
| Example 5 | Nylon | PVB | CB, 12 | Methanol:1-butanol t-butanol | 3:1 | 18.5 | 23 | None | 10 | 300 | 90% | 83% | G1 (Good) | G2 (Acceptable) |
| Example 6 | Nylon | PVB | CB, 12 | Methanol:1-butanol | 5:1 | 18.5 | 21 | None | 10 | 200 | 92% | 85% | G1 (Good) | G2 (Acceptable) |
| Example 7 | Nylon | PVB | CB, 12 | Methanol:1-butanol Cyclopentanol | 60:30:10 | 18.5 | 21 | None | 10 | 900 | 90% | 91% | G2 (Acceptable) | G2 (Acceptable) |
| Example 8 | Nylon | PVB | CB, 12 | Methanol:1-butanol | 3:1 | 18.5 | 21 | Used | 15 | 1100 | 90% | 92% | G2 (Acceptable) | G2 (Acceptable) |
| Example 9 | Nylon | PVB | KB, 10 | Methanol:1-butanol | 3:1 | 18.5 | 21 | None | 10 | 450 | 85% | 85% | G1 (Good) | G1 (Good) |
| Example 10 | Nylon | PVB | CB, 8 | Methanol:1-butanol | 3:1 | 18.5 | 21 | None | 10 | 600 | 83% | 90% | G1 (Good) | G1 (Good) |
| Conductive Example 1 | Nylon | PVB | CB, 12 | Methanol | 100 | 18.5 | 21 | None | 10 | 100 | 75% | No uneven distribution | G2 (Acceptable) | NG (Bad) |
| Conductive Example 2 | Nylon | PVB | CB, 12 | Methanol | 100 | 19.5 | 21 | None | 10 | 80 | 63% | 71% | G2 (Acceptable) | NG (Bad) |
| Conductive Example 3 | Nylon | PVB | CB, 12 | Methanol:1-butanol Cyclopentanol | 60:30:10 | 16 | 19 | Used | 10 | 1200 | 61% | 60% | G2 (Acceptable) | NG (Bad) |
| Conductive Example 4 | Nylon | PVB | CB, 12 | Methanol:1-butanol | 3:1 | 25 | 21 | None | 10 | 80 | 73% | No uneven distribution | NG (Bad) | NG (Bad) |
| Conductive Example 5 | Nylon | PVB | CB, 12 | Methanol:1-butanol | 3:1 | 18.5 | 27 | None | 10 | 50 | 70% | No uneven distribution | NG (Bad) | NG (Bad) |

In Table 1, PVB refers to polyvinyl butyral resin, CB refers to carbon black, and KB refers to Ketjenblack.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A conductive member comprising: a substrate; an elastic layer formed on the substrate; and a surface layer formed on the elastic layer, wherein the surface layer has a sea-island structure that includes a sea portion at least containing a first resin and a conductive agent and island portions at least containing a second resin,
    the island portions have an average diameter of at least 100 nm and not greater than $1/10$ of the thickness of the surface layer, and
    the conductive agent contained in the sea portion is unevenly distributed in a vicinity of an interface of the sea portion with the island portions,
    wherein the amount of the conductive agent that is present in the sea portion is not less than 80% relative to the total amount of the conductive agent contained in the surface layer.

2. The conductive member according to claim 1, wherein the average diameter of the island portions is not less than 150 nm.

3. The conductive member according to claim 1, wherein the average diameter of the island portions is not less than 200 nm.

4. The conductive member according to claim 1, wherein the average diameter of the island portions is not greater than $1/15$ of the thickness of the surface layer.

5. The conductive member according to claim 1, wherein the average diameter of the island portions is not greater than $1/20$ of the thickness of the surface layer.

6. The conductive member according to claim 1, wherein the amount of the conductive agent that is present in the sea portion is not less than 85% relative to the total amount of the conductive agent contained in the surface layer.

7. The conductive member according to claim 1, wherein the sea portion contains a polyamide resin as the first resin.

8. The conductive member according to claim 1, wherein the sea portion contains a methoxymethylated polyamide resin as the first resin.

9. A charging device comprising the conductive member according to claim 1.

10. A process cartridge comprising: an image carrier; and
    the charging device according to claim 9 that charges the image carrier, wherein
    the process cartridge is removably attached to an image forming apparatus.

11. An image forming apparatus comprising: an image carrier;
    the charging device according to claim 9 that charges the image carrier;
    a latent image forming device that forms a latent image on the surface of the charged image carrier;
    a developing device that develops the latent image on the surface of the image carrier with toner to form a toner image; and
    a transfer device that transfers the toner image formed on the surface of the image carrier to a recording medium.

* * * * *